United States Patent [19]

Perner et al.

[11] 4,260,724
[45] Apr. 7, 1981

[54] PREPARATION OF POLYMALEIC ACIDS FROM MALEIC ANHYDRIDE IN THE PRESENCE OF ACETIC ANHYDRIDE AND OF HYDROGEN PEROXIDE

[75] Inventors: Johannes Perner, Neustadt; Karl Stork, Lampertheim; Knut Oppenlaender, Ludwigshafen, all of Fed. Rep. of Germany

[73] Assignee: BASF Aktiengesellschaft, Fed. Rep. of Germany

[21] Appl. No.: 71,479

[22] Filed: Aug. 31, 1979

[30] Foreign Application Priority Data

Sep. 15, 1978 [DE] Fed. Rep. of Germany ....... 2840167

[51] Int. Cl.³ .......................... C08F 4/30; C08F 34/02; C08F 122/04; C08F 222/04
[52] U.S. Cl. .................................... 526/229; 526/271
[58] Field of Search ................................ 526/229, 271

[56] References Cited

U.S. PATENT DOCUMENTS

| | | | |
|---|---|---|---|
| 3,557,065 | 1/1971 | Blumberg et al. | 260/78.4 |
| 3,708,436 | 1/1973 | Thompson et al. | 252/527 |

FOREIGN PATENT DOCUMENTS 1349769  4/1974  United Kingdom .
1529092  10/1978  United Kingdom .

*Primary Examiner*—William F. Hamrock
*Attorney, Agent, or Firm*—Keil & Witherspoon

[57] ABSTRACT

An improved process for the preparation of polymaleic acids having molecular weights of from 200 to 1,500, by polymerizing maleic anhydride in acetic anhydride in the presence of from 0.2 to 0.5 mole of hydrogen peroxide per mole of maleic anhydride, at from 80° to 140° C., and builders and encrustation inhibitors comprising the polymaleic acids prepared by the said process, for use in detergents.

8 Claims, No Drawings

PREPARATION OF POLYMALEIC ACIDS FROM MALEIC ANHYDRIDE IN THE PRESENCE OF ACETIC ANHYDRIDE AND OF HYDROGEN PEROXIDE

The present invention relates to a novel process for the preparation of polymaleic acids, which have molecular weights of from 200 to 1,500, by polymerization of maleic anhydride in the presence of acetic anhydride and of hydrogen peroxide, with simultaneous hydrolysis of the polymaleic anhydride obtained.

The invention also relates to the use of the polymaleic acids obtained by this process as builders and encrustation inhibitors for use in detergents.

Up to the early 1960's, the polymerization of maleic anhydride in the absence of comonomers was considered impossible. It was only in 1961 that the first publications appeared (J. Polymer Sci. 55 (1961), 2 and Makromol. Chem. 53 (1962), 33) disclosing that maleic anhydride—hereafter referred to for convenience as MA—could be polymerized by UV irradiation and/or by initiation with organic peroxides. U.S. Pat. No. 3,708,436 discloses a polymerization process in which MA is polymerized in the presence of toluene and benzoyl peroxide.

British Pat. No. 1,349,969 discloses a process in which MA is polymerized in an inert solvent in the presence of $H_2O_2$ and acetic anhydride. Other methods (see German Laid-Open Application DOS No. 2,732,628 and British Pat. No. 1,411,063) employ, for example, di-tert.-butyl peroxide as the initiator for carrying out the polymerization. In these cases xylene, for example, is recommended as the solvent.

German Published Application DAS No. 2,047,340 discloses a process for the preparation of polymaleic acid, in which MA is polymerized in the presence of an acyl-maleylperoxide and boric acid or a boric acid derivative, and a hydrolysis is then carried out. The initiator can be prepared in situ in the system, ie. $H_2O_2$ and, for example, acetic anhydride are added to the batch. Accordingly, what is effectively used in the said publication is thus also the system $H_2O_2$/acetic anhydride.

The above U.S. Pat. No. 3,708,436 and German Published Application DAS No. 2,047,340 recommend these polymers as additives for detergents.

A feature common to all these processes is that the hydrolyzed products, ie. the polymaleic acids, can only be obtained by employing two process steps, namely polymerization of MA and subsequent hydrolysis of the poly-MA to polymaleic acid. Frequently, it has also been found that the products were obtained in poor yield and low purity. This is particularly true of the embodiment of the process described in German Published Application DAS No. 2,047,340. A repeat of this process showed that even after polymerization and hydrolysis, the main product present was monomeric maleic acid.

Further, it has been found that the use of polymaleic acids, obtainable by the processes disclosed, in the detergent industry has fallen far short of producing the results which had been hoped for.

In an article by Berth published in "Chemiker-Zeitung" 95, (1972) pages 550–551, mention is made, amongst other polyelectrolytes, of polymaleic acid (cf. the Table at the bottom of page 550), and the assessment of this product, as also of the other polyelectrolytes, by the above author is that the detergency of compositions containing such substances is very much lower than that of phosphate-containing detergents.

In view of the prior art, the present invention essentially has two objects.

It is one object of the present invention to provide a simple process, preferably in one step, for the preparation of polymaleic acids from maleic anhydride, which process ensures good yields and pure end products; the other object is, by using such a process, to provide products which exhibit better properties in the detergent sector, ie. the products should not only have a good calcium-binding capacity, which after all is only one of several requirements which builders have to meet, but should also bring closer a solution to the problem of encrustation which results from the omission of phosphates. Finally, the products should also be useful for washing white fabrics to a standard comparable to that achieved with phosphates.

We have found that these objects are achieved by a process wherein MA is dissolved in at least an equimolar amount, but preferably in an excess, of acetic anhydride and is polymerized in the presence of substantially larger amounts of $H_2O_2$ that have hitherto been proposed.

In this process, in which maleic anhydride is polymerized in the presence of hydrogen peroxide and acetic anhydride and the polymaleic anhydride is hydrolyzed, the improvement according to the invention is that the maleic anhydride, dissolved in from 1 to 5 moles of acetic anhydride per mole of maleic anhydride, is mixed with from 0.2 to 0.5 mole of hydrogen peroxide, per mole of maleic anhydride, and at the same time the reaction batch is heated to 80°–140° C., the reaction being completed at 100°–140° C. after the addition of the hydrogen peroxide.

We have found that using this method polymaleic acids which are already hydrolyzed and have relatively low molecular weights, namely from 200 to 1,500, are formed, which, in low-phosphate detergents, surprisingly prove to be excellent encrustation inhibitors, at the same time having a good calcium-binding capacity and a good washing action on white fabrics. Accordingly, they exhibit important characteristics previously only known to be shown by phosphates.

The process according to the invention is simple to carry out:

Maleic anhydride is dissolved in from 1 to 5 moles of acetic anhydride per mole of maleic anhydride, and from 0.2 to 0.5 mole of $H_2O_2$ per mole of MA is added, preferably in the form of a 30–50 percent strength aqueous solution, at from 80° to 140° C., preferably from 100° to 120° C. After the addition, the reaction takes place over from 1 to 8 hours at from 100° to 140° C., preferably from 100° to 120° C.

The $H_2O_2$ may be added all at once or gradually; preferably, it is slowly run into the reaction batch at the stated temperatures, with vigorous mechanical agitation. The duration of the addition is preferably from 1 to 5 hours.

To accelerate the reaction and improve the yields and purity of the polymers it has proved advantageous to add to the reaction batch small amounts (from 0.1 to 3, preferably from 0.1 to 2, percent by weight, based on MA) of an inorganic or organic acid.

Such acids should be non-oxidizing and specific examples are hydrochloric acid, sulfuric acid, orthoboric acid, toluenesulfonic acid, phosphoric acid, tartaric acid, citric acid and/or adipic acid.

The addition of reducing agents, and above all of reducing acids, which are added in the same amounts as the above acids, has a similar advantageous effect.

Examples of suitable reducing agents are hydrazine and hydroxylamine and their salts, as well as hydroquinone, pyrogallol and aldehydes, eg. formaldehyde, acetaldehyde or glutarodialdehyde, whilst suitable reducing acids, which are particularly preferred because they combine reducing capacity with an acidic action, are hypophosphorous acid, phosphorous acid, sulfurous acid, aldehyde-acids, eg. glyoxylic acid, phenolcarboxylic acids, eg. salicylic acid, and sugar acids, eg. ascorbic acid. Oxalic acid can also be employed successfully as a reducing acid.

The polymerization according to the invention gives hydrolyzed polymaleic acid in one process step.

The aqueous hydrogen peroxide, which is employed in an amount far in excess of the conventional catalytic amount, possibly serves simultaneously as a hydrolyzing agent.

The polymaleic acids can, if used in detergents, be neutralized in the conventional manner with alkali metal hydroxides, eg. NaOH or KOH.

They act as excellent encrustation inhibitors. In some cases, their action is so good that they even result in lower ash contents of washed fabrics than are achieved with phosphates, eg. pentasodium triphosphate, which are present to the extent of 40 percent by weight or more in conventional detergents.

Further, it has been found that the polymaleates have a high calcium-binding capacity and are useful in washing white fabrics.

The polymaleic acids or their salts can be added to the detergents in various amounts, depending on the end use. As encrustation inhibitors they are generally present in amounts of from 1 to 6 percent by weight, preferably from 0.5 to 5 percent by weight, based on solids. As phosphate substitutes, they can be present in amounts of up to 40 percent by weight.

The Examples which follow illustrate the preparation and use of the products according to the invention. In the Examples, parts are by weight.

EXAMPLES

(A) Preparation Examples

Hydrogen peroxide, in the form of a 50 percent strength aqueous solution, is added, with stirring, to a solution of maleic anhydride in acetic anhydride in the course of 4–5 hours at 110°–120° C.

The batch is then additionally kept for 2 hours at about 105° C.

After removing the liquid constituents by distillation, the solid polymer obtained is dried.

Thereafter, the hydrogenation iodine number, which is a measure of the residual monomer content, and the molecular weight of the solid product are determined.

In Table 1 below, product obtained with and without added acid or added reducing agent are listed. Where acids or reducing agents were used, they were added to the MA/acetic anhydride mixture before the reaction.

Examples 1 to 14 relate to products which were obtained employing the measures according to the invention.

Examples a to j show products where the starting mixtures employed molar ratios outside the limits according to the invention.

For use in detergents, the substances selected for the purpose were neutralized as follows:

1,000 parts of the polymaleic acid obtained according to the particular Example were dissolved in 900 parts of water at about 40°–50° C. and 890 parts of 50 percent strength sodium hydroxide solution were added. A solution, of about 50 percent strength, of the sodium salt of the polymaleic acid was obtained and was employed directly in the washing experiments.

The following abbreviations are employed in Table 1.
Ac = acetic anhydride
HIN = hydrogenation iodine number
MW = molecular weight
Y = yield in % by weight
Z = acid or reducing agent added in an amount of 1 percent by weight, based on MA In the column headed "Color," the figures of merit are as follows:

1 = almost colorless to 6 = black.

On this scale, a figure of merit of 3 (dark yellow) represents a substance which in the neutralized form is only just acceptable without producing objectionable coloration of detergents.

TABLE 1

| Example | Molar ratio MA:Ac:H$_2$O$_2$ | Z | Color rating | HIN | MW | Y |
|---|---|---|---|---|---|---|
| 1 | 1:1.35:0.45 | — | 3 | 14 | 220 | 100 |
| 2 | " | H$_3$PO$_3$ | 1.5 | 5.4 | 650 | 100 |
| 3 | " | Oxalic acid | 1.5 | 6.0 | 1,030 | 100 |
| 4 | " | Salicylic acid | 1.5 | 4.0 | 470 | 100 |
| 5 | " | Hydroquinone | 2 | 4.0 | 880 | 100 |
| 6 | " | Boric acid | 2 | 1.3 | 720 | 100 |
| 7 | " | Phosphoric acid | 3 | 6.0 | 460 | 95 |
| 8 | " | Sulfuric acid | 3 | 6.0 | 400 | 95 |
| 9 | " | p-Toluenesulfonic acid | 3 | 8.8 | 900 | 100 |
| 10 | " | Tartaric acid | 2 | 7.5 | 420 | 100 |
| 11 | " | Citric acid | 2 | 2.5 | 450 | 100 |
| 12 | " | Adipic acid | 2 | 3.0 | 420 | 100 |
| 13 | 1:1:0.45 | H$_3$PO$_3$ | 2 | 4.0 | 450 | 95 |
| 14 | 1:1.35:0.22 | H$_3$PO$_3$ | 3 | 20 | 350 | 92 |
| a | 1:1.35:0.1 | H$_3$PO$_3$ | 4 | 30 | 310 | 88 |
| b | 1:1.35:0.05 | H$_3$PO$_3$ | 5 | 37 | 230 | 77 |
| c | 1:1.35:0.02 | H$_3$PO$_3$ | 6 | 72 | 142 | 47 |
| d | 1:0.5:0.45 — | H$_3$PO$_3$ | 4.5 | 4 | 230 | 56 |
| e | 1:0.25:0.45 | H$_3$PO$_3$ | 5 | 10.5 | 180 | 20 |
| f | 1:1.35:0.1 | Boric acid | 6 | 35 | 150 | 5 |
| g | 1:1:0.45 | H$_3$PO$_3$ | 5 | 45 | 220 | 53 |

TABLE 1-continued

| Example | Molar ratio MA:Ac:H$_2$O$_2$ | Z | Color rating | HIN | MW | Y |
|---|---|---|---|---|---|---|
| h* | 1:1:0.45 | H$_3$PO$_3$ | 5 | 32 | 450 | 78 |
| i* | 1:1:0.45 | H$_3$PO$_3$ | 6 | 25 | 315 | 25 |
| j* | 1:1:0.45 | H$_3$PO$_3$ | 6 | 20 | 250 | 13 |

*In place of acetic anhydride, the following were used: acetic acid (Example g), xylene (Example h), toluene (Example i) and benzene (Example j).
After neutralization, the color figures of merit decreased by about 1 (with the exception of Examples 2 to 4 which gave colorless neutralization products (figure of merit 1)).
Figures of merit of 1 to 2 for neutralized products means that the polymaleates are useful in detergents.

The results show that working outside the range according to the invention results in unsatisfactory deepening of the color, which, even after neutralization, can no longer be rectified. At the same time, the yields also decrease, and the hydrogenation iodine numbers increase.

(B) Use Examples

The following polymaleic acids (as the Na salts) were tested, the acids being shown in order of increasing molecular weight:

|  | Molecular weight |
|---|---|
| Polymaleic acid from Example 1 | 220 |
| Polymaleic acid from Example 10 | 420 |
| Polymaleic acid from Example 11 | 450 |
| Polymaleic acid from Example 2 | 650 |
| Polymaleic acid from Example 5 | 880 |
| Polymaleic acid from Example 3 | 1,030 |

In addition, hydrolyzed polymaleic acids obtained according to German Laid-Open Application DOS No. 2,732,628 and German Published Application DAS No. 2,047,340 were tested.

(a) Encrustation tests

The tests were carried out with a commercial detergent which contained 30 percent by weight of Na tripolyphosphate.

| Washing machine | Launder-Ometer |
|---|---|
| Temperature | 40–95° C. |
| Washing time | 45 min |
| Number of washing cycles | 20 |
| Water hardness | 22° German hardness |
| Liquor concentration | 5 g/l |
| Liquor ratio | 12.5:1 |
| Test fabric | cotton, from Waschereiforschungsinstitut Krefeld |
| Ashing | 2 hours at 600° C. |

The detergent was mixed with 5, 2.5 or 1 percent by weight—based on non-aqueous detergent constituents, of polymaleic acid, and, for comparison, of other encrustation inhibitors, proposed in the prior art.

The test results are summarized in Table 2.

TABLE 2

| Inhibitor from Example | Ash content (% by weight, based on fabric) on addition of 5, 2.5 or 1% by weight, based on detergent | | |
|---|---|---|---|
|  | 5 | 2.5 | 1 |
| 1 | 0.19 | 2.15 | 3.50 |
| 10 | 0.13 | 1.90 | 3.40 |
| 11 | 0.15 | 1.95 | 3.45 |
| 2 | 0.16 | 2.17 | 3.55 |
| 5 | 0.15 | 2.00 | 2.95 |
| 3 | 0.20 | 2.15 | 3.45 |
| MA/methyl vinyl ether copolymer | 3.51 | 5.95 | 6.76 |
| Polyacrylic acid, K value = 20 | 5.32 | >6[3)] | >6 |
| Polyacrylic acid, K value = 40 | 5.36 | >6 | >6 |
| Polyacrylic acid, K value = 100 | 5.14 | >6 | >6 |
| Polyacrylic acid, K value = 150 | 4.80 | 5.95 | >6 |
| Copolymer of acrylic acid and hydroxypropyl acrylate | 5.68 | 6.70 | — |
| Dimethylmalonic acid | 5.23 | >6 | >6 |
| Mixtures of succinic, glutaric and adipic acid | 5.38 | >6 | >6 |
| Aminomethylenephosphonic acid | 1.44 | 4.50 | >6 |
| Nitrilotriacetic acid | 1.23 | 4.14 | 5.71 |
| Polymaleic acid according to Example 1 of German Laid-Open Application DOS 2,732,628 (hydrolyzed with NaOH) | 3.87 | 6.18 | 6.27 |
| Polymaleic acid according to German Published Application DAS 2,047,340 (hydrolyzed with NaOH) | 5.48 | 5.76 | 5.90 |

[3)]The [>6] values no longer warranted precise determination.

Blank experiments:

| Detergents without additive | 6.49% ash |
|---|---|
| Starting fabric | 0.08% ash |
| Detergent containing 40% of sodium tripolyphosphate | 0.5% ash |

The polymaleates prepared according to the invention are thus superior to all other additives.

(b) Calcium-binding capacity

The determination of the Ca-binding capacity was carried out by turbidimetric titration with Ca acetate solution. For this purpose, 1 g of the polymaleic acid salt to be tested, or of the comparative substance of the prior art, is dissolved in 100 ml of water and 10 ml of 2% strength sodium carbonate solution are then added. The pH value of this solution is brought to 11 and is kept constant during the titration. The titration is carried out with 4.4% strength calcium acetate solution until a persistent turbidity results. The calcium acetate solution is added in portions of 1 ml at intervals of 30 seconds. 1 ml of calcium acetate solution consumed corresponds to 25 mg of calcium carbonate.

The data in Table 3 below are given in milligrams of calcium carbonate per gram of complexing agent.

TABLE 3

| Polymaleic acid (as the Na salt) from Example | Calcium-binding capacity in mg of $CaCO_3$/g at 25° C. | 90° C. |
| --- | --- | --- |
| 1 | 425 | 275 |
| 10 | 475 | 300 |
| 11 | 550 | 325 |
| 2 | 525 | 275 |
| 5 | 550 | 300 |
| 3 | 450 | 300 |
| Na salt of polymaleic acid from German Laid-Open Application DOS 2,732,628 | 180 | 150 |
| Sodium tripolyphosphate | 225 | 150 |

(c) Washing action on white fabrics

Using a heavy-duty detergent, the sodium tripolyphosphate (pentasodium triphosphate) constituent of the sequestering agent was replaced in stages by one of the polymaleic acid salts of the invention, and the washing action on white fabric was determined on a cotton test fabric from Wäschereiforschungsinstitut Krefeld.

The washing machine used was a Launder-O-meter, under the following test conditions:

| | |
| --- | --- |
| Temperature | 40–95° C. |
| Washing time | 45 min |
| Water hardness | 16° German hardness |
| Detergent concentration | 5 g/l |
| Liquor ratio | 25:1 |
| pH | 10.5 |

Composition of the detergent concentrate:
- 10% by weight of Na $C_{12}$-alkylbenzenesulfonate
- 5% by weight of adduct of $C_{16}/C_{19}$-fatty alcohol with 11 moles of ethylene oxide
- 5% by weight of coconut fat/tallow (80:20) soap
- 10% by weight of $Na_2SO_4$
- 20% by weight of sodium perborate
- 40% by weight of sequestering agent
- 10% by weight of water The results are shown in Table 4 below.

The detergent action on the white fabric was determined by examining the washed test cloths in an ELREPHO instrument the reflectance in percent being measured

TABLE 4

| Sodium polymaleate from Example | Detergent action on white fabric | | | |
| --- | --- | --- | --- | --- |
| | 1 part of polymaleate 3 parts of phosphate | 1 part of polymaleate 1 part of phosphate | 3 parts of polymaleate 1 part of phosphate | Polymaleate |
| 1 | 74.2 | 72.0 | 73.9 | 76.1 |
| 10 | 73.3 | 75.2 | 74.9 | 75.3 |
| 11 | 71.2 | 73.6 | 72.9 | 73.2 |
| 2 | 75.3 | 74.6 | 73.3 | 73.9 |
| 5 | 73.8 | 74.5 | 74.4 | 75.4 |
| 3 | 74.6 | 73.9 | 75.1 | 74.8 |
| Pentasodium triphosphate without additive | 73.0 | | | |
| Polymaleate from Example 1 of German Laid-Open Application DOS 2,732,628 | | | | 68.0 |

Summarizing, it is found that the compounds obtained by the process according to the invention can at least partially replace phosphates in respect of inhibition of encrustation, calcium-binding capacity and detergent action on white fabric.

We claim:

1. In a one-step process for the preparation of a polymaleic acid having a molecular weight of from 200 to 1,500, wherein maleic anhydride is polymerized in the presence of hydrogen peroxide and acetic anhydride and the resulting polymaleic anhydride is hydrolyzed, the improvement which comprises:
   - dissolving the maleic anhydride to be polymerized in from 1 to 5 moles of acetic anhydride per mole of maleic anhydride;
   - adding to the maleic anhydride solution from 0.2 to 0.5 mole of hydrogen peroxide per mole of maleic anhydride while at the same time heating the reaction batch to from 80°–140° C., whereupon the polymerization and simultaneous hydrolysis is completed at 100°–140° C., and thereafter isolating the polymaleic acid.

2. The process of claim 1, wherein the reaction is carried out in the presence of from 0.1 to 3%, based on the weight of maleic anhydride, of an inorganic or organic non-oxidizing acid.

3. The process of claims 1 or 2, wherein the reaction is carried out in the presence of from 0.1 to 3%, based on the weight of maleic anhydride, of a reducing agent.

4. The process of claim 3, wherein the reaction is carried out in the presence of from 0.1 to 3%, based on the weight of maleic anhydride, of a reducing agent.

5. A polymaleic acid having a molecular weight of from 200 to 1,500, obtained by the process of claim 1.

6. A polymaleic acid obtained by the process of claim 2.

7. A polymaleic acid obtained by the process of claim 3.

8. A polymaleic acid obtained by the process of claim 4.

* * * * *